Aug. 22, 1939.    T. N. PIERSON    2,170,573
GRAIN PAN RAISING AND LOWERING MECHANISM
Filed Oct. 18, 1937    3 Sheets-Sheet 1

INVENTOR
Torvald N. Pierson.
BY
ATTORNEY

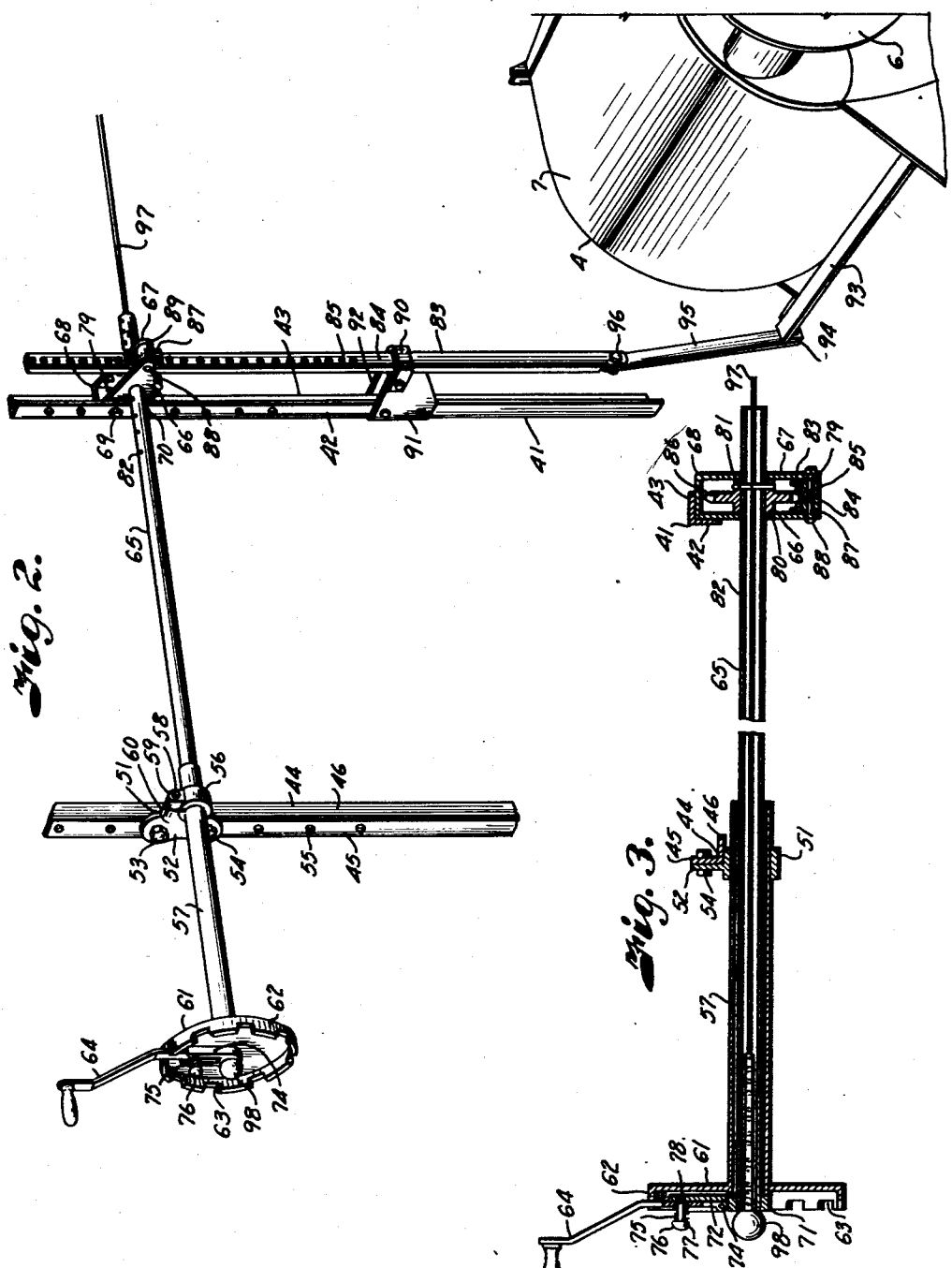

Aug. 22, 1939.  T. N. PIERSON  2,170,573
GRAIN PAN RAISING AND LOWERING MECHANISM
Filed Oct. 18, 1937   3 Sheets-Sheet 3
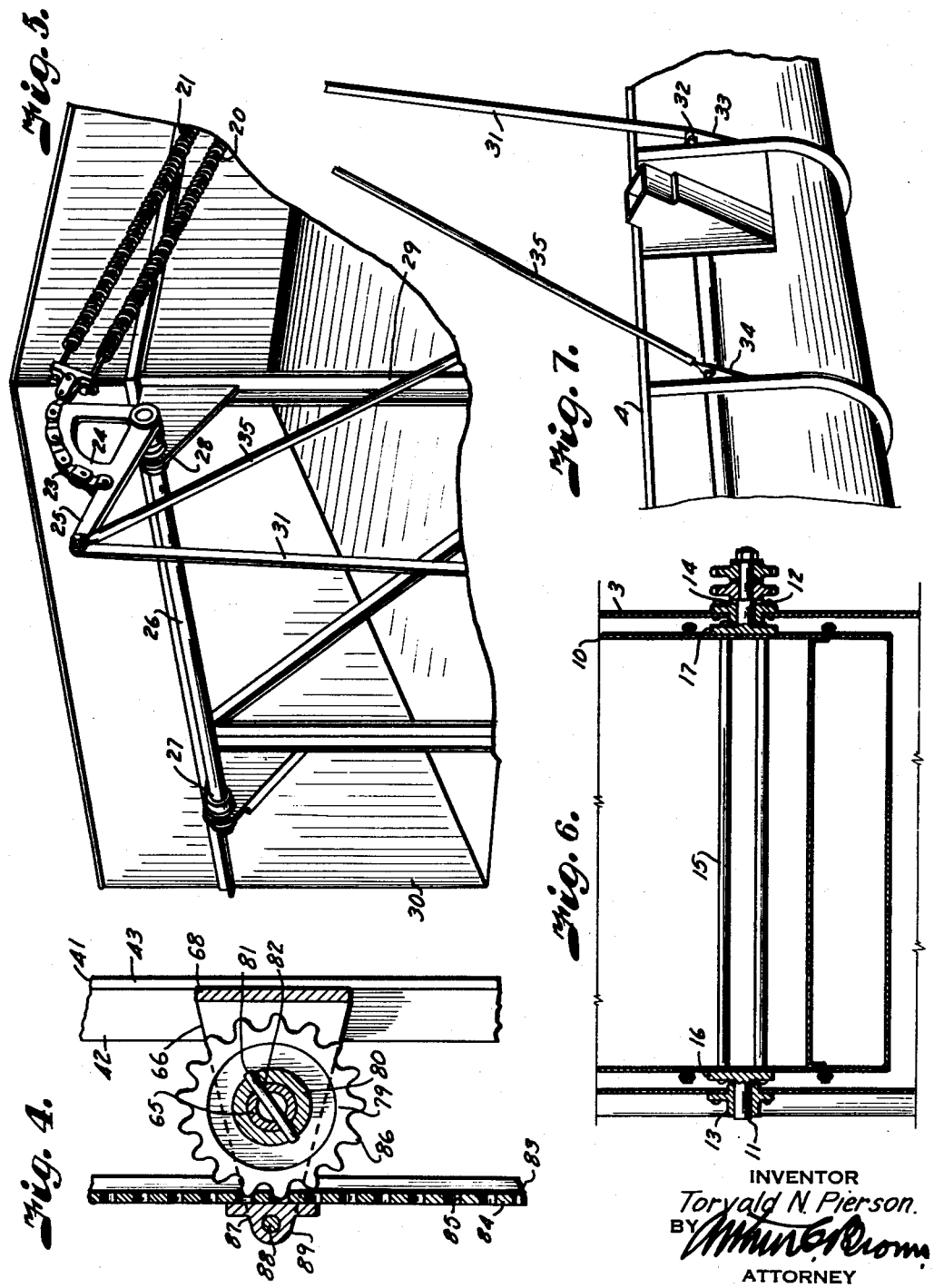
INVENTOR
Torvald N. Pierson.
BY
ATTORNEY Patented Aug. 22, 1939

2,170,573

UNITED STATES PATENT OFFICE 2,170,573

GRAIN PAN RAISING AND LOWERING MECHANISM

Torvald N. Pierson, Independence, Mo., assignor to Gleaner Harvester Corporation, Independence, Mo., a corporation of Delaware Application October 18, 1937, Serial No. 169,623

4 Claims. (Cl. 56—208)

REISSUED
JAN 3 0 1940

This invention relates to harvesting machines and more particularly to a mechanism for raising and lowering the grain pan including the sickle, whereby the sickle is selectively positioned in accordance with the height of the grain being harvested.

The principal object of the invention is to provide a simple mechanism of this character that is readily operated from the tractor or draft vehicle which draws the harvester.

It is also an important object of the invention to provide for adaptation of the control mechanism to various makes of tractors so that the operating crank is located in convenient reach of the operator.

In accomplishing these and other objects of the invention, as hereinafter pointed out, I have provided improved details of structure, the preferred form of which is illustrated in the accompanying drawings, wherein:

Fig. 2 is an enlarged detail perspective view of parts of the raising and lowering mechanism, and particularly illustrating connection with the grain pan of the harvester.

Fig. 3 is a longitudinal sectional view through the control shaft, particularly illustrating the construction which permits of ready positioning of the operating crank relatively to the draft vehicle.

Fig. 4 is an enlarged detail section through the rack and pinion for raising and lowering the harvester pan.

Fig. 5 is a detail perspective view of a part of the harvester frame, particularly illustrating suspension and counterbalance of the harvesting unit of the machine.

Fig. 6 is a detail section through the pivotal connection of the harvester unit with the separator unit of the machine.

Fig. 7 is a detail perspective view of the rear of the grain pan showing connection of the grain pan suspension rods.

Figure 1:
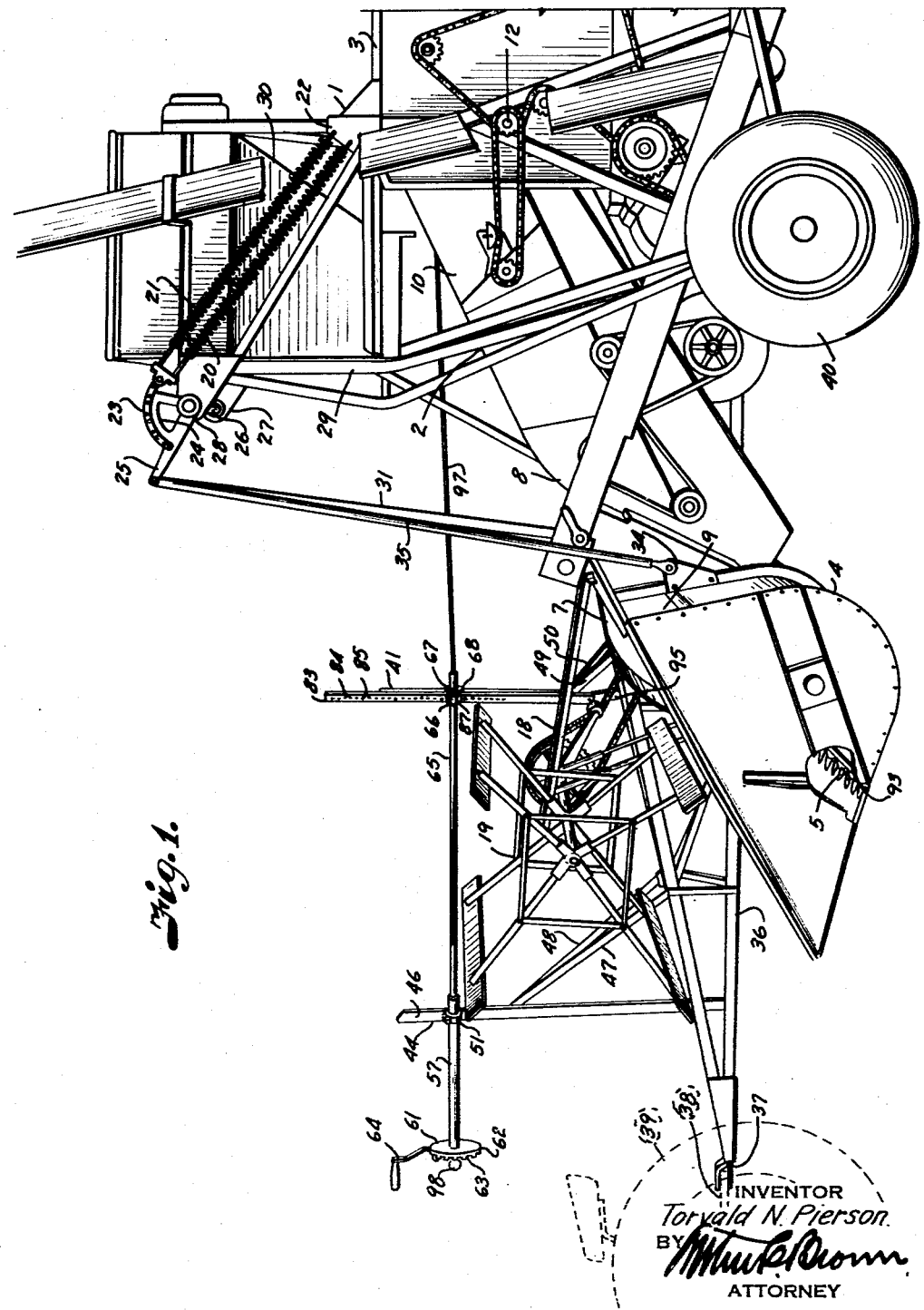
Fig. 1 is a perspective view of the forward portion of a combine harvester equipped with raising and lowering mechanism constructed in accordance with the present invention.

Referring more in detail to the drawings:

I designates a combine harvester including a main frame 2 formed of structural members for supporting a separating unit indicated by the housing 3. Pivotally connected with the main frame is a harvesting unit, including a laterally extending grain pan 4 carrying a sickle 5 and a conveyor 6 for moving cut grain longitudinally of the pan and into a feed chamber 7 from which the cut grain is discharged into the cylinder housing 8. The cylinder housing 8 is rigidly connected with the wind-board 9 of the grain pan, and connects with a rearwardly extending conveyor housing 10 through which the threshed grain is delivered into the separating unit 3.

The conveyor housing 10 pivots within the forward open end of the separator housing and carries trunnions 11 and 12 that are journalled in bearings 13 and 14 carried by the sides of the separator housing, as best shown in Fig. 6. In order to stiffen the sides of the conveyor housing the trunnions are preferably connected by truss rods 15 that extend transversely across the housing and connect with flanges 16 and 17 of the trunnions, as shown in Fig. 6. Rotatably supported above the sickle, and carried by the frame 18 of the grain pan, is a reel 19 for moving the grain into contact with the sickle as in conventional practice.

It is thus obvious that the harvesting unit just described, including the threshing and conveyor housings 8 and 10, is pivoted relatively to the main frame of the machine so that the sickle may be positioned in accordance with the height of the grain being harvested. The harvesting unit is counterbalancingly suspended in any of its adjusted positions by means of counterbalance springs 20 and 21, having one of their ends fixed to a gusset plate 22 attached to the main frame and having their opposite ends secured to a flexible connection 23 that is operable over an arcuate cam 24, and which has its opposite end connected with a forwardly projecting arm 25 connected with the cam 24. The cam 24 is fixed on a cross shaft 26 that is rotatably mounted in spaced bearings 27 and 28 carried by an upwardly extending portion 29 of the main frame which supports the grain bin 30, as best shown in Figs. 1 and 5. Pivotally connected with the outer end of the arm is a depending rod or bar 31 having its lower end pivotally connected, as at 32, with a bracket 33 extending from the wind-board 9 of the grain pan, as best shown in Fig. 7. Also pivotally connected with the arm 25, and having its lower end pivotally connected with a bracket 34 that is secured to the wind-board of the grain pan at a point spaced from the bracket 33 in the direction of the outer end of the pan, is a brace rod 35 to support the outer end of the pan.

Extending forwardly of the main frame, on the side opposite the grain pan, is a truss-like tongue 36, having a draft connection 37 which is adapted to be connected with the draw bar 38 of a draft vehicle or tractor 39, and which co-operates with the harvester wheels 40 to support the main frame and separator unit for mobility of the machine.

In operating the machine it is necessary that the grain pan 4 be raised and lowered so that the sickle is kept in proper cutting relation with the height of the grain, and in small harvesting machines it is desirable that the control mechanism for raising and lowering the pan be actuated by the operator of the tractor, and, as above pointed out, I have provided a control mechanism, as now to be described.

Extending upwardly from the tongue 36, in substantial alignment with the sickle 5, is a post-like member 41, which is shown in the drawings as comprising an angle iron arranged with one of its flanges 42 extending in a plane parallel with the axis of the grain pan, and with its other flange 43 extending in a plane parallel with the longitudinal direction of the tongue, as best shown in Fig. 2. Fixed to the forward end of the tongue is a similar post 44, having flanges 45 and 46 reversely positioned relative to the flanges of the post 41. The posts are rigidly supported in perpendicular position by brace bars 47 and 48 for the post 44, and 49 and 50 for the post 41.

Adjustably mounted on the post 44 is a clamping bracket 51 having a flange 52 secured to the flange 45 by fastening devices, such as bolts 53 and 54, that are projected through pairs of aligning openings 55 in the flange of the post whereby the bracket may be adjusted for height relatively to the operator's position of the tractor, previously described. The bracket also includes a split collar 56 that is clamped about a tube 57 by means of a cap screw 58 extending through lugs 59 and 60 on opposite sides of the split portion of the collar, as shown in Fig. 2. Fixed to the opposite end of the tube 57, which projects in the direction of the operator's seat of the tractor, is a disk 61 having a forwardly extending peripheral flange 62 that is provided with a series of notches 63 forming a circular rack for engagement with an operating crank 64, later described. Rotatably mounted within the tube 57 is an actuating shaft 65, also preferably formed of a tube, and which is of sufficient length to extend from the forward end of the tube 57 through the arms 66 and 67 of a yoke-shaped bracket 68 that is adjustably attached to the post 41 by bolts 69 and 70 that are projected through selected pairs of openings provided in the flange 42, similar to mounting of the clamping bracket previously described, and whereby the yoke-shaped bracket may be adjusted in elevation according to the elevational position of the clamping bracket. One end of the tubular shaft is thus rotatably supported in the tube 57 and its opposite end in the bearing openings of the arms so that it may be rotated by means of the crank 64, as now to be described.

Fixed to the forward end of the tubular shaft 65, within the confines of the flange 62, is a collar 71, having a channel-shaped arm 72 terminating slightly short of the flange 62. The crank 64 is pivotally supported between the flanges 72 of the arm on a pin 74 so that it is adapted to be moved to and from the arm to effect engagement and disengagement thereof with the notches 63. The crank 64 is normally retained in notch engaging position by means of a coil spring 75, having one end bearing against the crank and its opposite end against the head 76 of a pin 77 that extends loosely through an opening 78 in the crank and into anchored engagement with the arm 72, as best shown in Fig. 3. The spring thus retains the crank in engagement with the arm and within one of the notches 63 to prevent rotation of the tubular shaft. Adjustably fixed on the opposite end of the shaft, between the arms 66 and 67 of the yoke-like bracket 68, is a pinion gear 79, having a hub 80 sleeved on the shaft 65 and secured by a pin 81 extending through suitable openings in the hub and through one of a series of openings 82 provided in the shaft, as best shown in Figs. 2 and 3. Guidingly supported between the arms 66, and in meshing relation with the pinion, is a rack bar 83, shown as a channel member and having the web 84 thereof provided with a series of openings 85 adapted to engage with the teeth 86 of the pinion. The rack bar is retained in tooth engagement by a shoe 87 that is retained by a pin 88 extending through the terminal ends of the arm and through a lug 89 of the shoe, as shown in Fig. 4. The lower end of the rack bar is reciprocable within a loop-like guide 90 that is attached to bracket plates 91 and 92 fixed to the lower portion of the supporting post 41, as shown in Fig. 2.

The sickle supporting bar 93 at the forward edge of the pan projects laterally from the feed chamber 7, and is pivotally connected, as at 94, with a link 95 that is pivotally connected with the lower end of the rack bar by means of a pivot pin 96, so as to compensate for arcuate movement of the pan relatively to reciprocatory movement of the rack bar when the grain pan is raised or lowered to any of its selected positions.

The operating mechanism of a harvesting machine of the character described is usually actuated by a prime mover, carried upon the main frame of the machine, through a clutch connection that is preferably controlled by the operator of the tractor. The shaft 65 is, therefore, of tubular form so that the clutch operating cable 97 may be guidingly extended therethrough and connected with a control knob 98 normally engaging against the forward end of the tubular shaft and in convenient reach of the operator.

In adjusting a raising and lowering mechanism constructed as described, the crank is positioned relatively to the height of the operator's seat by locating the clamp bracket 56 and yoke-shaped bracket 68 at the desired elevation on the posts 44 and 41 respectively. This is readily accomplished by removing the bolts 53, 54, 69 and 70, moving the brackets, and replacing the bolts in the proper openings in the flanges of the posts. The crank lever is then positioned to and from the operator's seat by loosening the cap screw 58 so that the supporting tube 57 may be shifted in the clamp collar 56 to effect desired adjustment. Prior to this adjustment the pin 81 is removed from the hub of the pinion gear so that the tubular shaft may slide within the arms 66 and 67 of the bracket 68. After the crank has been positioned, the pin 81 is reinserted through the hub of the pinion gear and through the nearest of the aligning openings 82 of the shaft 65. The supporting tube 57 is then repositioned so that the collar 71 closely engages the forward end thereof, whereupon the clamping collar 56 is tightened about the tube by tightening the cap screw 58.

In operating the control mechanism to raise or lower the harvesting unit, the crank is pivoted forwardly against action of the spring 75 to withdraw the crank from engagement with one of the notches 63. The crank is then rotated to effect rotation of the shaft 65 and reciprocation of the rack bar incidental to its meshing engagement with the pinion gear to effect raising or lowering of the grain pan through the link 95 depending upon the direction of rotation of the crank. After the pan has been adjusted for height the crank is released so that the spring 75 urges it into engagement with the nearest notch 63 to supportingly retain the grain pan in adjusted position.

It is thus obvious that I have provided a simple control mechanism that is readily adjusted to the convenience of the operator of the draft vehicle, and that the mechanism is readily operated to effect substantially rapid elevational adjustment of the harvesting unit.

What I claim and desire to secure by Letters Patent is:

1. In a harvester of the character described, a main frame, a harvesting unit adjustably movable on the main frame, draft means connecting the main frame with a draft vehicle, spaced standards supported on the draft means, a clamp fixed to the foremost standard, a supporting tube having one end engaged in the clamp and its other end extending forwardly in the direction of the draft vehicle, a crank engaging member on the forward end of the supporting tube, a bearing bracket on the other standard, a shaft rotatably mounted in said tube and bearing bracket, a crank on the shaft selectively engageable with said crank engaging member, a pinion fixed on the shaft, a rack bar meshing with the pinion, and means connecting the rack bar with the harvesting unit.

2. In a harvester of the character described, a main frame, a harvesting unit adjustably movable on the main frame, draft means connecting the main frame with a draft vehicle, spaced standards supported on the draft means, a clamp fixed to the foremost standard, a supporting tube having one end adjustably engaged in the clamp and its other end extending forwardly in the direction of the draft vehicle, a crank engaging member on the forward end of the supporting tube, a yoke-shaped bearing bracket on the other standard, a shaft rotatably mounted in said tube with its other end rotatable in the bearing bracket and provided with a series of apertures arranged therein, a crank on the shaft selectively engageable with said crank engaging member, a pinion having a hub embraced in said yoke-shaped bearing bracket, a pin extending through the hub and a selected aperture in said shaft, a rack bar meshing with the pinion, and means connecting the rack bar with the harvesting unit.

3. In a harvester of the character described, a main frame, a harvesting unit adjustably movable on the main frame, draft means connecting the main frame with a draft vehicle, spaced standards supported on the draft means, a clamp fixed to the foremost standard, a supporting tube having one end adjustably engaged in the clamp and its other end extending forwardly in the direction of the draft vehicle, a crank engaging member on the forward end of the supporting tube, a yoke-shaped bearing bracket on the other standard, a shaft rotatably mounted in said tube with its other end rotatable in the bearing bracket and provided with a series of apertures arranged therein, a crank on the shaft selectively engageable with said crank engaging member, a pinion having a hub embraced in said yoke-shaped bearing bracket, a pin extending through the hub and a selected aperture in said shaft, a rack bar meshing with the pinion, and means connecting the rack bar with the harvesting unit, said clamp and bearing bracket being adjustable vertically of said standards to position the crank at a selected elevation relatively to a driver's seat on the draft vehicle.

4. In a harvester of the character described, a main frame, a harvesting unit adjustably movable on the main frame, draft means connecting the main frame with a draft vehicle, spaced standards supported on the draft means, a clamp fixed to the foremost standard, a supporting tube having one end engaged in the clamp and its other end extending forwardly in the direction of the draft vehicle, a crank engaging member on the forward end of the supporting tube, a yoke-shaped bearing bracket on the other standard, a shaft rotatably mounted in said tube and slidably and rotatably mounted in said bearing bracket, a crank on the shaft selectively engageable with said crank engaging member, a pinion engaged in said yoke-shaped bearing bracket, means adjustably fixing the pinion to the shaft, a rack bar meshing with the pinion, a roller carried by said bracket and having rolling engagement with the rack bar to retain the rack bar in meshing contact with the pinion, and means connecting the rack bar with the harvesting unit.

TORVALD N. PIERSON.